US010796292B2

(12) United States Patent
White

(10) Patent No.: US 10,796,292 B2
(45) Date of Patent: *Oct. 6, 2020

(54) METHOD AND APPARATUS FOR FULFILLING PURCHASES

(71) Applicant: AT&T Intellectual Property I, L.P., Atlanta, GA (US)

(72) Inventor: Scott White, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 184 days.

This patent is subject to a terminal disclaimer.

(21) Appl. No.: 16/011,210

(22) Filed: Jun. 18, 2018

(65) Prior Publication Data

US 2018/0300704 A1    Oct. 18, 2018

Related U.S. Application Data

(63) Continuation of application No. 15/424,273, filed on Feb. 3, 2017, now Pat. No. 10,026,072, which is a continuation of application No. 14/248,867, filed on Apr. 9, 2014, now Pat. No. 9,600,812, which is a continuation of application No. 11/692,714, filed on Mar. 28, 2007, now Pat. No. 8,732,020.

(51) Int. Cl.
*G06Q 20/20* (2012.01)
*G06Q 30/06* (2012.01)

(52) U.S. Cl.
CPC .......... *G06Q 20/202* (2013.01); *G06Q 30/06* (2013.01)

(58) Field of Classification Search
None
See application file for complete search history.

(56) References Cited

U.S. PATENT DOCUMENTS

| 10,026,072 | B2* | 7/2018 | White ................. G06Q 20/202 |
| 2005/0027543 | A1 | 2/2005 | Labrou et al. |
| 2005/0125301 | A1 | 6/2005 | Muni |
| 2005/0187873 | A1 | 8/2005 | Labrou et al. |
| 2005/0203854 | A1 | 9/2005 | Das et al. |
| 2006/0018450 | A1 | 1/2006 | Sandberg-Diment |
| 2006/0111967 | A1 | 5/2006 | Forbes et al. |
| 2006/0265281 | A1 | 11/2006 | Sprovieri et al. |
| 2007/0022058 | A1 | 1/2007 | Labrou et al. |
| 2007/0178938 | A1 | 8/2007 | Kravitz et al. |
| 2007/0244811 | A1 | 10/2007 | Tumminaro et al. |
| 2017/0148004 | A1 | 5/2017 | White |

FOREIGN PATENT DOCUMENTS

| EP | 1548667 A1 | 6/2005 |
| WO | 2004/008276 | 1/2004 |

* cited by examiner

*Primary Examiner* — Paul Danneman
(74) *Attorney, Agent, or Firm* — Guntin & Gust, PLC; Douglas Schnabel

(57) ABSTRACT

A method and apparatus for fulfilling purchases is disclosed. A system that incorporates teachings of the present disclosure can include, for example, a portable communication device having a controller element that receives from an online system a barcode image as an object of acknowledgment of a product purchased from said online system, and presents on a display of the portable communication device said barcode image to complete a purchase fulfillment process by way of at least one among a visual inspection of the barcode image by a merchant employee and processing of said barcode image by a point of sale (POS) device. Additional embodiments are disclosed.

20 Claims, 4 Drawing Sheets

METHOD AND APPARATUS FOR FULFILLING PURCHASES

CROSS-REFERENCE TO RELATED APPLICATIONS

This application is a continuation of U.S. patent application Ser. No. 15/424,273, filed Feb. 3, 2017, which is a continuation of U.S. patent application Ser. No. 14/248,867, filed Apr. 9, 2014 (now U.S. Pat. No. 9,600,812), which is a continuation of U.S. patent application Ser. No. 11/692,714 filed Mar. 28, 2007 (now U.S. Pat. No. 8,732,020). All sections of the aforementioned applications are incorporated herein by reference in their entirety.

FIELD OF THE DISCLOSURE

The present disclosure relates generally to portable communication devices, and more specifically to a method and apparatus for fulfilling purchases.

BACKGROUND

Today it is not uncommon for a consumer to make a purchase online for products or services that can be redeemed locally by presenting a local merchant a printed receipt from the online transaction. In such instances, the merchant can authenticate the printed receipt using a point of sale terminal or by visual inspection. Movie tickets, airline tickets, and other retail goods and services can be purchased in this manner.

Although this approach has proven useful, inconveniences can arise when the printed receipt is lost, stolen, or misplaced. For example, a merchant may not readily allow completion of the online transaction without a printed receipt. In circumstances where the merchant can be flexible, it may take sometime for the merchant to validate the transaction by other means (e.g., consumer pin number, driver's license, etc.), and the consumer may be required to pay a validation fee.

A need therefore arises for a method and apparatus for fulfilling purchases.

DETAILED DESCRIPTION

Embodiments in accordance with the present disclosure provide a method and apparatus for fulfilling purchases.

In a first embodiment of the present disclosure, a portable communication device can have a controller element that receives from an online system a barcode image as an object of acknowledgment of a product purchased from said online system, and presents on a display of the portable communication device said barcode image to complete a purchase fulfillment process by way of at least one among a visual inspection of the barcode image by a merchant employee and processing of said barcode image by a point of sale (POS) device.

In a second embodiment of the present disclosure, a point of sale (POS) device can have a controller element that receives an object of acknowledgment from a portable communication device. The portable communication device on the other hand receives said object of acknowledgment from an online system responsive to a product being purchased from the online system. The controller element of the POS device completes a purchase fulfillment process associated with the purchased product according to the object of acknowledgment.

In a third embodiment of the present disclosure, a online system can have a controller element that distributes an object of acknowledgment to a portable communication device to complete a purchase fulfillment process by presentation of the object of acknowledgment to a merchant by way of the portable communication device.

In a fourth embodiment of the present disclosure, a method can involve a retailer that completes an online purchase fulfillment process by accepting an object of acknowledgment presented by a portable communication device of a consumer.

Figure 1:
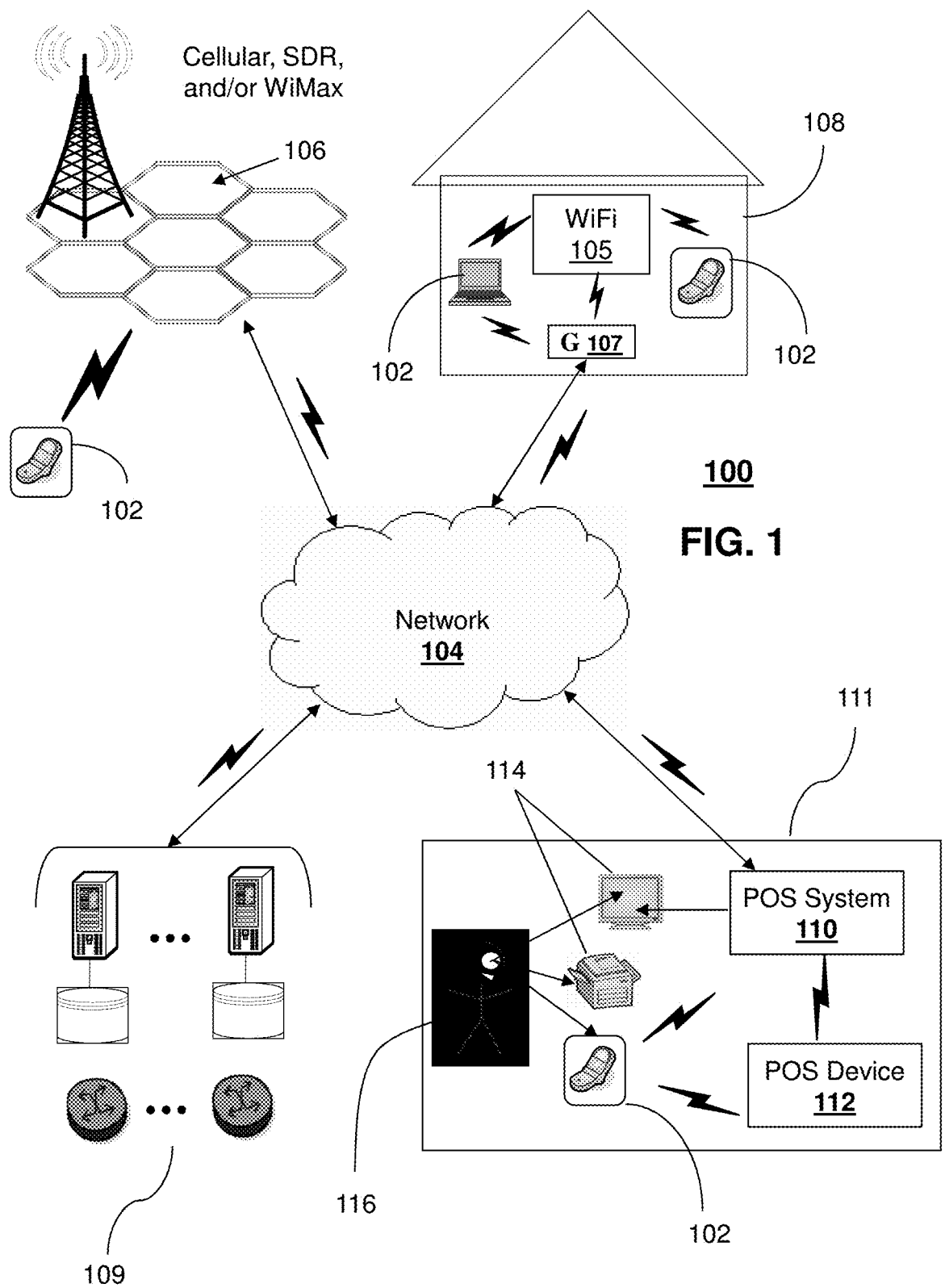
FIG. 1 depicts an exemplary embodiment of a communications system.

FIG. 1 depicts an exemplary embodiment of a portable communication device 102 operating in portions of a communication system 100. The portable communication device 102 in the present illustration can represent a multimode portable communication device such as a cell phone, laptop computer or personal digital assistant capable of supporting wireline and wireless communication technologies. In the case of wireline communications, the portable communication device can utilize xDSL, cable, or PSTN telephony interfaces for communicating with network 104 which can include hybrid technologies that support circuit-switched packet-switched communications. The portable communication device 102 can also support accessory interfaces such as USB, Firewire, and other connectivity technologies.

Alternatively, or in combination, the portable communication device 102 support any number of wireless communication protocols such as the family of 802 protocols defined by the Institute of Electrical and Electronics Engineers (IEEE). For instance, the portable communication device 102 can utilize long-range wireless access technologies such as, for example, cellular, software defined radio (SDR) and/or WiMAX to communicate with networks 106. Cellular access technologies can include, for example, CDMA-1X, UMTS/HSDPA, GSM/GPRS, TDMA/EDGE, EV/DO, and next generation technologies as they arise. Additionally, the portable communication device 102 can support short-range wireless technologies such as WiFi, Bluetooth, Zigbee, or cordless communications such as digital enhanced cordless telecommunications (DECT). The portable communication device 102 can also incorporate a passive or active RFID transmitter and receiver for communicating with RFID-capable devices such as RFID readers.

Furthermore, the portable communication device 102 can access one or more online systems 109 through network 104. Online systems 109 can correspond to one or more web servers operating as centralized or distributed computing systems. For example, online systems 109 can include systems for product inquiry and sales quotes, order configuration and order booking, order acknowledgment and confirmation, order sourcing and planning, order changes, shipment and delivery, and invoicing and billing—just to mention a few. Other purchase fulfillment systems not described herein that can operate as online systems 109 for the purpose of purchasing products and/or services can also be applied to the present disclosure.

Additionally, the portable communication device 102 can be configured to interface with one or more point of sale (POS) devices 112 managed by a POS system 110 of a merchant. The POS system 110 can represent one or more computing devices such as one or more servers that manages a number of POS devices 112 utilized by merchant personnel to complete the sales of goods or services purchased from the online system 109. The POS system 110 can serve as a repository for recording purchase fulfillment transactions processed by the POS devices 112, and for managing said transactions in cooperation with the online system 109. The POS system 110 can operate as a centralized or distributed computing system.

The POS devices 112 can be configured to support the wireline and/or wireless access technologies discussed above (e.g., USB, Bluetooth, RFID, WiFi, etc.) for the portable communication device 102. The POS devices 112 can represent a scanner (e.g., barcode readers), credit or debit card reader, cash register, or any other suitable POS technology that can be used to interface with the portable communication device 102. With this technology, the portable communication device 102 can present a POS device 112 purchase fulfillment information in the form of image, audible, a coded messages by wire or wirelessly means to complete an online purchase transaction. The POS devices 112 can communicate with the POS system 110 utilizing the same or similar wireline or wireless access technology used to interface to the portable communication device 102.

Figure 2:
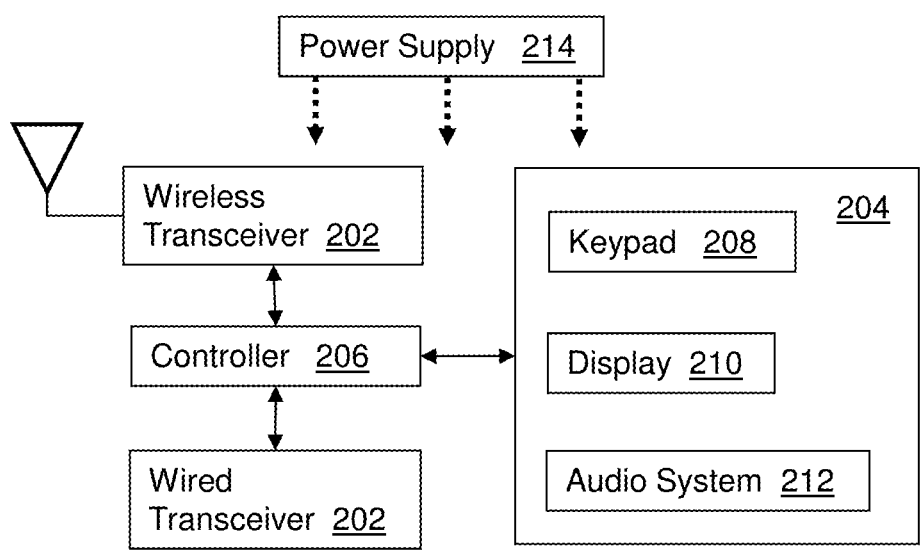
FIG. 2 depicts an exemplary embodiment of a portable communication device operating in the communications system.

FIG. 2 depicts an exemplary embodiment of the portable communication device 102. The portable communication device 102 can comprise a wireline and/or wireless transceiver 202, a user interface (UI) 204, a power supply 214, and a controller 206 for managing operations thereof. The wireline and/or wireless technologies included in the transceiver 202 can conform to the aforementioned short-range and long-range access technologies. The UI 204 can include a depressible or touch-sensitive keypad 208 for manipulating operations of the portable communication device 102. The UI 204 can further include a display 210 such as monochrome or color LCD (Liquid Crystal Display) for conveying images to the end user of the portable communication device 102. The audio system 212 of the UI 204 can utilize common audio technology for conveying and intercepting audible signals of the end user.

By way of the UI 204, the portable communication device 102 can present purchasing information in the form of audible, visual, or coded messages to POS devices 112 and/or merchant employees 116. Audible messages can be presented as speech or unintelligible tones (e.g., a sequence of DTMF tones, or some other form of modulated tones). Visual messages can be presented by the UI 204 as artwork, barcodes, or other form of presentable purchase information such as receipts. Coded messages can represent receipts that are encoded with identifiers known to the POS system 110 of the merchant. The portable communication device 102 can also be programmed to present combinations of these embodiments.

The power supply 214 can utilize common power management technologies (such as replaceable batteries, supply regulation technologies, and charging system technologies) for supplying energy to the components of the portable communication device 102 to facilitate portable applications. The controller 206 can utilize computing technologies such as a microprocessor and/or digital signal processor (DSP) with associated storage memory such a Flash, ROM, RAM, SRAM, DRAM and other like technologies.

Figure 3:
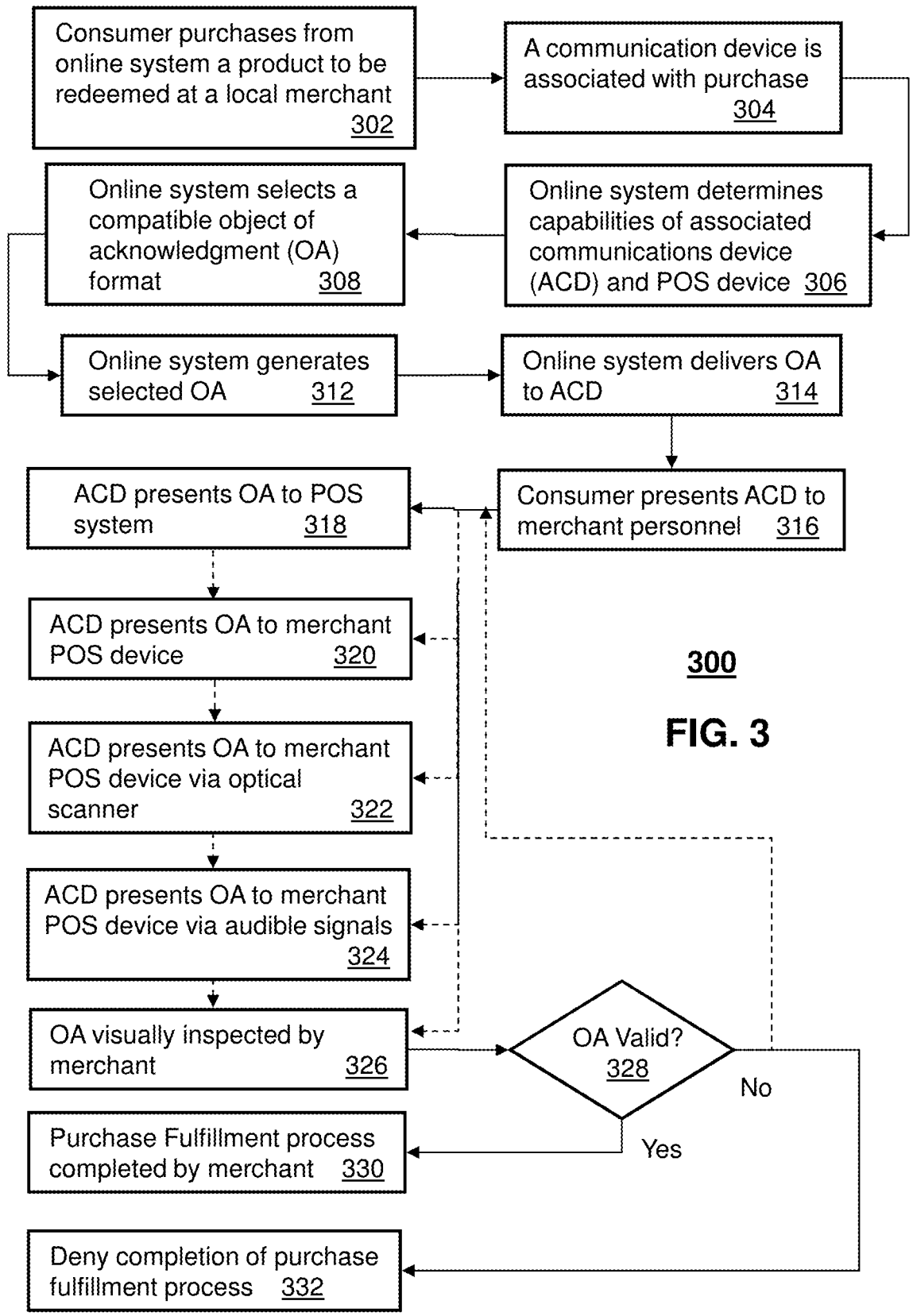
FIG. 3 depicts an exemplary method operating in the communications system.

FIG. 3 depicts and exemplary method 300 operating in portions of the communications system 100 such as the portable communication device 102, the online system 109, the POS system 110, and/or the POS devices 112. With this in mind, method 300 begins with step 302 in which one or more online systems 109 are accessed by a user with a common computing device (e.g., a home computer) with access to the Internet to make an online purchase of one or more products available for pickup or servicing by a local merchant. The computing device can also represent the portable communication device 102 previously described. That is, a consumer having a portable communication device 102 with Internet access can make in step 302 online purchases while in transit.

Regardless of the access method, the online transaction can be processed using common web services techniques such as selecting goods or services from a catalog or menu and paying for such goods or services by electronic means such as debit card numbers, credit card numbers or with third-party payment systems (e.g., PayPal™). The term "products" as used in the present context can mean physical goods available at a merchant location 111 or services or performances that merchants such as contractors, professionals, tradesmen, or performers can provide to a consumer. For example, products can include tickets for concerts, sporting events, and other performance-type events. In another example, products can include pre-paid services including maintenance services (e.g., oil change), insurance coverage (e.g., dentist or other MD appointment), and other arrangements in which payment can be provided in advance for services.

The online system 109 can be operated by a commercially independently enterprise that supplies third-party sales services to the merchant. That is, a merchant can procure services from an online service provider by agreement with a fee sharing arrangement for sales consummated on the online system 109. Alternatively, the online system 109 can be owned and operated by the merchant. This latter embodiment can be useful to merchants having the resources of a large enterprise.

Once a consumer has purchased an online product in step 302 as described above, a portable communication device 102 of the consumer can be associated in step 304 with the purchase. Such an association can be accomplished in several ways. In some instances, the consumer can proactively specify the portable communication device 102 to be associated with the purchase. For example, during the online transaction the user can provide a phone number or email address of the portable communication device 102 with the purchase.

In another embodiment, the online system 109 can be configured to automatically associate the portable communication device 102 with the online transaction based on prerecorded registration information supplied by the consumer while establishing a personal account on the online system 109. In situations where a consumer is using the portable communication device 102 to make a purchase, the online system 109 can be configured to identify the portable communication device 102 by common means (e.g., a caller ID, or login information), and thereby automatically associate the transaction with the detected portable communication device.

Once the portable communication device 102 has been associated with the purchase in step 304, the online system 109 determines in step 306 the capabilities of the associated portable communication device (ACD) 102 and the POS device 112 of the merchant that will supply the purchased product. In some instances, the capabilities of the ACD 102 can be specified by the consumer during the association step 304. For example, the consumer can specify whether the ACD 102 supports specific messaging features such as short messaging services (SMS) or multimedia messaging services (MMS). Additionally, the consumer can specify other available features, such as a speakerphone, color display, etc.

Alternatively, the capabilities for the ACD 102 can be determined by retrieving the capabilities of the ACD 102 from a database according to a model number supplied by the consumer. In another embodiment, the online system 109 can be configured to automatically detect the type of ACD 102 from a communication exchange with the ACD, and thereby retrieve its capabilities from a database. Other methods for determining the capabilities of the ACD 102 not described herein can also be applied to the present disclosure. The online system 109 determines the capabilities of the merchant's POS devices 112 from merchant supplied information previously recorded in the database of the online system 109.

In step 308, the online system 109 selects a format for an object of acknowledgement (OA) that is compatible with the ACD 102 and POS devices 112 of the merchant based on the determinations made in step 306. OAs can represent images, audio signals, coded messages, and/or associated computer instructions in the form of a software routine that perform specific purchase fulfillment routines in the ACD 102 for interacting with the POS devices 112. In cases where the online system 109 supports more than one merchant each with differing models of POS devices 112, the online system 109 can be programmed to select an OA that conforms to the working specifications of the ACD 102 and the POS devices 112. In other situations where the merchant can fulfill the online purchase by visual inspection of the OA presented by the UI 204 of the ACD 102, step 306 can focus instead on the specifications of the ACD 102 and the visual format of the OA preferred by the merchant.

OA formats can be stored in the online system 109 or can be retrieved from the merchant's POS system 110. An OA format can comprise a barcode format compatible with a POS device 112 operating as a barcode scanner. Alternatively, the OA can be a coded sequence that the ACD 102 can transmit directly to the POS system 110 without interaction with a POS device 112 (or by way of the POS device). The coded sequence can represent a binary or text message with or without encryption that can include information associated with the online purchase and can be utilized by the POS system 110 to close the transaction.

Once the ACD 102 capabilities and the merchant OA format preferences have been retrieved in steps 306 and 308, the online system 109 proceeds to step 312 where it generates the selected OA and delivers the OA to the ACD 102 in step 314. Delivery can be over-the-air (OTA) or by wireline as previously discussed. For OTA transmission, the OA can be delivered as an SMS message if it is a text or binary coded sequence, or as an MMS message if an image and/or audio with text or binary coding is included in the OA. Other wireless messaging formats of more or less complexity can also be used. Images can be constructed from JPEG, GIF or other common imaging formats. Moreover, images can be still and/or moving images. An audio message can be delivered as a MIDI or MP3 audio file. Other audio formats can be used.

Once the online system 109 has delivered the OA to the ACD 102 in step 314, the consumer can present the ACD 102 to the merchant's POS device 112 in step 316. The POS device 112 can be located at a fixed merchant location 111 such as a building or other structure. In other cases location can be mobile. For example, tow-truck services offered at the location of the consumer's car. Therefore, the merchant location can be the location where services are to be provided.

Depending on the ACD 102 and merchant requirements, the ACD 102 can present in steps 318-324 the delivered OA in several ways. In step 318, for example, the ACD 102 can be configured to present the OA to the POS system 110 by direct communications (e.g., coded sequence transmitted by ACD to POS system), or by way of a merchant employee 116 that interacts with the POS system using a common terminal device such as a computer terminal to manually enter information associated with the OA. In the latter embodiment, the merchant employee 116 can, for example, observe a visual representation of the OA from the UI 204 of the ACD 102. The OA can provide purchase fulfillment information (e.g., a purchase code) which the merchant employee 116 can enter in the POS system 110.

Alternatively, the ACD 102 can be configured to present an OA to the POS device 112 through a wireline or wireless interface. For example, the ACD 102 can be coupled to the POS device 112 using a wireline connection, such as a USB cable. In another example, the ACD 102 can be coupled to the POS device 112 by wireless means such as WiFi, Bluetooth, or RFID. With these methods, the OA can be transferred by the POS device 112 to the POS system 110 which acknowledges the purchase and records the transaction.

Alternatively, the ACD 102 in step 322 can be configured to present the OA as an image to the POS device 112 that scans the OA with a built-in optical scanner. For example, the OA can be represented by a barcode presented by the display 210 of the UI 204. The POS device 112 can operate as a barcode reader that can scan the barcode and transfer the decoded sequence to the POS system 110 for processing, purchase acknowledgment and recordation utilizing common techniques. In another example, the image presented to the POS interface can include the presentation of one or more characters which can be read and interpreted by a POS device 112 using for example optical character recognition (OCR) techniques. The synthesized characters can then be transmitted to the POS system 110 to perform the functions previously described. In yet another example, the ACD 102 can present artwork associated with the online purchase. The POS device 112 can utilize common image processing techniques to scan and/or decode the artwork. The verification of the artwork can take place at the POS device 112, the POS system 110, or in part at both systems 110-112.

Alternatively, or in combination with steps 320-322, the ACD 102 in step 324 can be configured to present the OA as an audio message. For example, the audio message presented can be generated from a MIDI file, an MP3 file, or some other suitable audio format. In such a configuration, a POS device 112 can comprise an audio receiver to interpret the audio message and transfer the deciphered information to the POS system 110 for the purposes previously described. As previously noted, the audio message presented can be a DTMF tone sequence or other form of a modulated audio signal that is not audibly intelligible to the human ear to maintain the exchange with the POS device 112 private.

Alternatively, or in combination with steps 320-324, the ACD 102 in step 326 can be configured to present the OA as an image for inspection by merchant employee 116. In this embodiment, the merchant can simply inspect the OA as an image in the UI 204 of the ACD 102 to complete the transaction. The merchant employee 116 can be trained to look at color markings, artwork, text information or otherwise.

In step 328, the merchant employee 116 or the POS system 110 can apply verification techniques to determine the validity of the OA. For example, in the case of a visual-only inspection (step 326), the merchant can minimize the risk of accepting a counterfeit OA by instructing personnel of the online system 109, or by communications between the POS system 110 and said online system to periodically (perhaps daily) change the artwork of the OA, thereby increasing the difficulty of sharing OAs, or creating counterfeits. In other cases, the POS system 110 can be programmed to authenticate the OA by its format, its artwork, coded messages, or other suitable techniques for verification.

To further improve the validation step 328, the OA can also be formatted with security features specified by the merchant or agreed to between the merchant and online service provider. Such security features can comprise indicia or coloring as noted earlier that can be readily identified by a merchant employee 116. For example, a warranty card presented to a repairman can include specific indicia or coloring indicative of a level of warranty coverage. In another example, tickets for a sporting event can include a particular design and/or be presented in only one recognizable color. Security features such as these can be used when visual inspection of the OA is more practical and less costly than using a POS system 110 with image processing capabilities. Other security features such as including a password or an encrypted message in the OA can be used by the POS system 110 or the merchant employee 116.

If the OA is detected as valid in step 328, the purchase fulfillment process is completed by the POS system 110 (or the merchant employee 116), and the consumer is supplied the goods or services purchased online. If the POS system 110 determines that the OA is not valid, the merchant can notify the consumer that the product requested cannot be delivered due to an authentication failure. If the transaction appears suspicious, the merchant employee 116 can further inform security to analyze the legitimacy of the transaction.

Upon reviewing the aforementioned embodiments, it would be evident to an artisan with ordinary skill in the art that said embodiments can be modified, reduced, or enhanced without departing from the scope and spirit of the claims described below. For example, to improve security, the OA can be formatted by the online system 109 with common digital rights management (DRM) policy features. With DRM, the consumer cannot share the OA. Moreover, the OA can be programmed to have an expiration date at which it is automatically deleted by the ACD 102. Additionally, the ACD 102 can be programmed to transmit the OA in whole or in part to the POS device 112 or the POS system 110 rather than present it through the UI 204. For example, a barcode image, audio file, text message, or like OA-related information can be transmitted to the POS device 112 or POS system 110 rather than presenting it on the display 210 or by way of the audio system 212 of UI 204.

These are but a few examples of modifications that can be applied to the present disclosure without departing from the scope of the claims stated below. Accordingly, the reader is directed to the claims section for a fuller understanding of the breadth and scope of the present disclosure.

Figure 4:
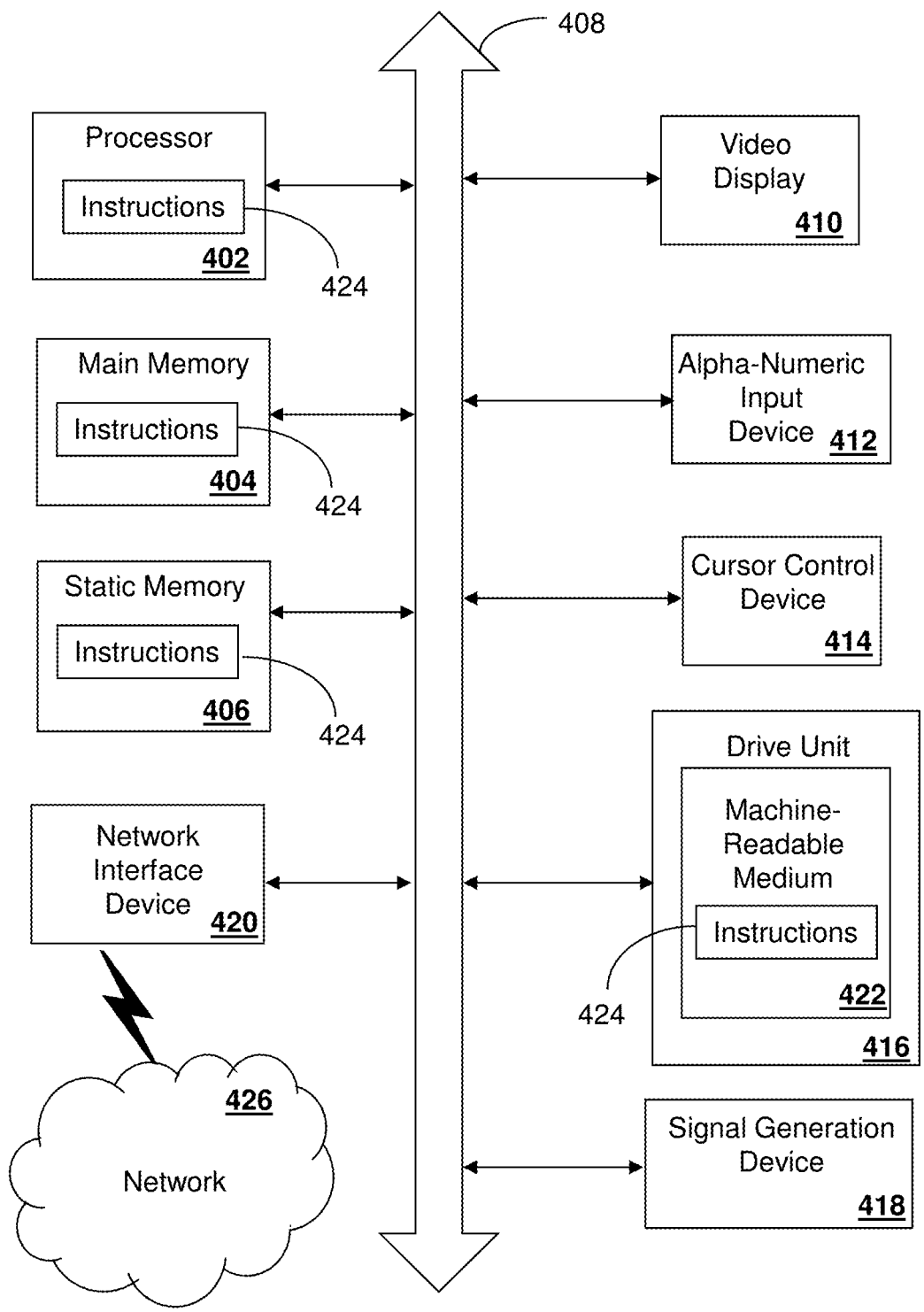
FIG. 4 depicts an exemplary diagrammatic representation of a machine in the form of a computer system within which a set of instructions, when executed, can cause the machine to perform any one or more of the methodologies disclosed herein.

FIG. 4 depicts an exemplary diagrammatic representation of a machine in the form of a computer system 400 within which a set of instructions, when executed, can cause the machine to perform any one or more of the methodologies discussed above. In some embodiments, the machine operates as a standalone device. In some embodiments, the machine can be connected (e.g., using a network) to other machines. In a networked deployment, the machine can operate in the capacity of a server or a client user machine in server-client user network environment, or as a peer machine in a peer-to-peer (or distributed) network environment.

The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 can include a processor 402 (e.g., a central processing unit (CPU), a graphics processing unit (GPU, or both), a main memory 404 and a static memory 406, which communicate with each other via a bus 408. The computer system 400 can further include a video display unit 410 (e.g., a liquid crystal display or LCD), a flat panel, a solid state display, or a cathode ray tube (CRT)). The computer system 400 can include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 can include a machine-readable medium 422 on which is stored one or more sets of instructions (e.g., software 424) embodying any one or more of the methodologies or functions described herein, including those methods illustrated above. The instructions 424 can also reside, completely or at least partially, within the main memory 404, the static memory 406, and/or within the processor 402 during execution thereof by the computer system 400. The main memory 404 and the processor 402 also can constitute machine-readable media.

Dedicated hardware implementations including, but not limited to, application specific integrated circuits, programmable logic arrays and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 can further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations comprising:
detecting an online transaction associated with a communication device;
selecting, according to a type of the communication device, a format for an object of acknowledgment associated with the online transaction;
generating the object of acknowledgment according to the format; and
providing the object of acknowledgment to the communication device for presentation to a merchant device associated with a fulfillment process for the online transaction.

2. The device of claim 1, wherein the operations further comprise detecting the type of a communication device.

3. The device of claim 1, wherein the operations further comprise determining capabilities of the communication device, wherein the selecting of the format for the object of acknowledgement is further selected according to the capabilities of the communication device.

4. The device of claim 3, wherein the determining of the capabilities of the communication device is based on the type of the communication device.

5. The device of claim 1, wherein the operations further comprise determining capabilities of a merchant device remote from the processing system, wherein the format for the object of acknowledgment is further selected according to the capabilities of the merchant device.

6. The device of claim 1, wherein the online transaction includes a transfer of funds.

7. The device of claim 1, wherein the object of acknowledgement is authenticated at the merchant device.

8. The device of claim 1, wherein a digital rights management policy prevents sharing of the object of acknowledgement with another device.

9. The device of claim 1, wherein a digital rights management policy causes the object of acknowledgement to be deleted according to an expiration date.

10. The device of claim 1, wherein the operations further comprise associating the communication device with the online transaction based on information previously provided by the communication device.

11. The device of claim 1, wherein the object of acknowledgment includes information associated with an audio signal.

12. The device of claim 1, wherein the object of acknowledgment includes instructions to perform a fulfillment routine including a transfer of funds to a merchant system associated with the merchant device.

13. The device of claim 1, wherein the operations comprise providing the object of acknowledgment for display at a user interface of the communication device.

14. A non-transitory machine-readable storage device comprising executable instructions which, when executed by a processing system including a processor, facilitate performance of operations comprising:
 initiating an online transaction;
 receiving, from a server, an object of acknowledgment according to a type of a communication device responsive to the initiating of the online transaction; and
 presenting the object of acknowledgment at a display for capture by a merchant device associated with a fulfillment process for the online transaction.

15. The non-transitory machine-readable storage device of claim 14, wherein the operations further comprise providing, to a server, information associated with the communication device.

16. The non-transitory machine-readable storage device of claim 15, wherein the information includes user input captured while establishing an account, and wherein the information is recorded on a database accessible by the processing system.

17. The non-transitory machine-readable storage device of claim 14, wherein the object of acknowledgment includes instructions to perform a fulfillment routine associated with the communication device being communicatively coupled with the merchant device.

18. The non-transitory machine-readable storage device of claim 14, wherein the object of acknowledgement is authenticated at the merchant device.

19. A method comprising:
 detecting, by a processing system including a processor, an online transaction associated with a communication device;
 selecting, by the processing system, a format for an object of acknowledgment associated with the online transaction, wherein the format is compatible with capabilities of the communication device; and
 providing, by the processing system, the object of acknowledgment according to the format to the communication device for presentation to a merchant device associated with a fulfillment process for the online transaction.

20. The method of claim 19, further comprising:
 detecting, by a processing system including a processor, a type of the communication device that is remote from the processing system; and
 determining, by the processing system, the capabilities of the communication device based on the type of the communication device.

* * * * *